(12) United States Patent
Flannigan et al.

(10) Patent No.: US 10,513,107 B2
(45) Date of Patent: Dec. 24, 2019

(54) LEVER TRAY RELEASE

(71) Applicant: Stratasys, Inc., Eden Prairie, MN (US)

(72) Inventors: James Flannigan, Roseville, MN (US); Peter D. Schuller, Elko, MN (US); Jordan Paul Nadeau, St. Louis Park, MN (US); Shawn Michael Koop, Blaine, MN (US)

(73) Assignee: STRATASYS, INC., Eden Prairie, MN (US)

( * ) Notice: Subject to any disclaimer, the term of this patent is extended or adjusted under 35 U.S.C. 154(b) by 198 days.

(21) Appl. No.: 15/237,144

(22) Filed: Aug. 15, 2016

(65) Prior Publication Data

US 2018/0043636 A1    Feb. 15, 2018

(51) Int. Cl.
*B33Y 50/02* (2015.01)
*B33Y 30/00* (2015.01)
*B29C 64/245* (2017.01)
*B29C 64/118* (2017.01)

(52) U.S. Cl.
CPC ............ *B33Y 50/02* (2014.12); *B29C 64/245* (2017.08); *B33Y 30/00* (2014.12); *B29C 64/118* (2017.08)

(58) Field of Classification Search
CPC ...... B29C 67/0092; B33Y 30/00; B33Y 50/02
See application file for complete search history.

(56) References Cited

U.S. PATENT DOCUMENTS

| | | |
|---|---|---|
| 6,004,124 A | 12/1999 | Swanson et al. |
| 6,629,011 B1 | 9/2003 | Calderon et al. |
| 6,722,872 B1 | 4/2004 | Swanson et al. |
| 7,063,285 B1 | 6/2006 | Turley et al. |
| 7,127,309 B2 | 10/2006 | Dunn et al. |
| 7,604,470 B2 | 10/2009 | LaBossiere et al. |
| 7,625,200 B2 | 12/2009 | Leavitt |
| 7,938,356 B2 | 5/2011 | Taatjes et al. |
| 8,403,658 B2 | 3/2013 | Swanson |
| 8,439,665 B2 | 5/2013 | Batchelder et al. |
| 8,985,497 B2 | 3/2015 | Mannella et al. |
| 9,073,263 B2 | 7/2015 | Mannella et al. |
| 9,108,360 B2 | 8/2015 | Comb et al. |
| 9,205,690 B2 | 12/2015 | Leavitt et al. |
| 9,327,447 B2 | 5/2016 | Batchelder et al. |
| 2005/0173855 A1* | 8/2005 | Dunn ...................... B29C 64/40 269/291 |
| 2009/0241290 A1* | 10/2009 | Jones ..................... B41J 3/4071 16/291 |
| 2013/0242317 A1* | 9/2013 | Leavitt ................... B41J 29/393 358/1.8 |
| 2014/0252684 A1 | 9/2014 | Swanson et al. |

FOREIGN PATENT DOCUMENTS

WO    2016014543 A1    1/2016

* cited by examiner

*Primary Examiner* — Jacob T Minskey
*Assistant Examiner* — Melody Tsui
(74) *Attorney, Agent, or Firm* — Westman, Champlin & Koehler, P.A.

(57) ABSTRACT

A platen assembly for use in a 3D printer includes a frame and a platen supported by the frame. The platen is configured to receive a removable build tray. A lever release mechanism of the platen assembly is coupled to the frame and is configured to both secure the build tray to the platen for printing of the part, and to eject the build tray from the platen after printing of the part.

12 Claims, 4 Drawing Sheets

LEVER TRAY RELEASE

BACKGROUND

The present disclosure relates to 3D printers for printing or otherwise producing three-dimensional (3D) parts. In particular, the present disclosure relates to build surfaces and substrates for 3D printing, including mechanisms for securing and releasing build substrates to build surfaces.

Additive manufacturing, also called 3D printing, is generally a process in which a three-dimensional (3D) object is built by adding material to form a 3D part rather than subtracting material as in traditional machining. One basic operation of an additive manufacturing system consists of slicing a three-dimensional computer model into thin cross sections, translating the result into two-dimensional position data, and feeding the data to control equipment which manufacture a three-dimensional structure in an additive build style. Additive manufacturing entails many different approaches to the method of fabrication, including fused deposition modeling, ink jetting, selective laser sintering, powder/binder jetting, electron-beam melting, electrophotographic imaging, and stereolithographic processes. Using one or more additive manufacturing techniques, a three-dimensional solid object of virtually any shape can be printed from a digital model of the object by an additive manufacturing system, commonly referred to as 3D printer.

In a fused deposition modeling additive manufacturing system, a printed part may be printed from a digital representation of the printed part in an additive build style by extruding a flowable part material along toolpaths. The part material is extruded through an extrusion tip carried by a print head of the system, and is deposited as a sequence of roads onto a substrate. The extruded part material fuses to previously deposited part material, and solidifies upon a drop in temperature. In a typical system where the material is deposited in planar layers, the position of the print head relative to the substrate is incremented along an axis (perpendicular to the build plane) after each layer is formed, and the process is then repeated to form a printed part resembling the digital representation.

In fabricating printed parts by depositing layers of a part material, supporting layers or structures are typically built underneath overhanging portions or in cavities of printed parts under construction, which are not supported by the part material itself. A support structure may be built utilizing the same deposition techniques by which the part material is deposited. A host computer generates additional geometry acting as a support structure for the overhanging or free-space segments of the printed part being formed. Support material is then deposited from a second nozzle pursuant to the generated geometry during the printing process. The support material adheres to the part material during fabrication, and is removable from the completed printed part when the printing process is complete.

Build surfaces and substrates are used in additive process modeling techniques to stabilize a 3D printed part as it is built and allow removal of the part when it is complete. Typically, it is preferred that a 3D printed part or model under construction be strongly adhered to its modeling substrate, and the modeling substrate can be removable to remove the completed part from the machine. Strains generated within the modeling material tend to warp the deposited structures unless the structures are supported in their correct orientation. Strong adherence to the substrate serves to prevent warpage and avoid localized shrinkage in foundation layers. Also, in some deposition processes, there are external forces that act on the deposited structures, such as pull from an extrusion nozzle, and centripetal acceleration on parts that are not stationary. Adherence of the printed part to the substrate must be sufficient to resist these forces. Delamination of a foundation layer from the substrate during the building of the object can result in a total failure in forming the object. Further, since the substrate is a defining surface for the object being built, the substrate itself must be held in a well-defined configuration. Typically, it is desirable that the substrate be held in a configuration approximating a plane.

The discussion above is merely provided for general background information and is not intended to be used as an aid in determining the scope of the claimed subject matter.

SUMMARY

An aspect of the present disclosure is directed to a platen assembly for use in a 3D printer when printing a part. The platen assembly includes a frame and a platen supported by the frame. The platen is configured to receive a removable build tray. A lever release mechanism of the platen assembly is coupled to the frame and is configured to both secure a received build tray to the platen for printing of the part, and to eject the build tray from the platen after printing of the part.

Another aspect of the present disclosure is directed to a combination for use in a 3D printer when printing a part. The combination includes a removable build tray and a platen assembly. The platen assembly includes a frame, a platen supported by the frame and configured to receive the removable build substrate, and a lever release mechanism coupled to the frame. The lever release mechanism of the platen assembly is configured to both secure the build tray to the platen for printing of the part, and to provide a mechanical advantage in ejecting the build tray from the platen after printing of the part.

A 3D printer includes a gantry configured to move in a plane substantially parallel to a build plane and a platen assembly configured to support a part being built in a layer by layer process. The platen assembly is configured to move in a direction substantially normal to the build plane, and includes a frame, a platen supported by the frame and configured to receive a removable build tray, and a lever release mechanism coupled to the frame. The lever release mechanism is configured to both secure the build tray to the platen for building of the part, and to eject the build tray from the platen after building of the part. The additive manufacturing system further includes a head carriage carried by the gantry and a print head carried by the head carriage.

This Summary and the Abstract are provided to introduce a selection of concepts in a simplified form that are further described below in the Detailed Description. This Summary is not intended to identify key features or essential features of the claimed subject matter.

DEFINITIONS

Unless otherwise specified, the following terms as used herein have the meanings provided below:

The terms "preferred", "preferably", "example" and "exemplary" refer to embodiments of the invention that may afford certain benefits, under certain circumstances. However, other embodiments may also be preferred or exemplary, under the same or other circumstances. Furthermore, the recitation of one or more preferred or exemplary embodiments does not imply that other embodiments are not useful, and is not intended to exclude other embodiments from the scope of the present disclosure.

Directional orientations such as "above", "below", "top", "bottom", and the like are made with reference to a layer-printing direction of a 3D part. In the embodiments shown below, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, such as along a horizontal x-axis or y-axis, the terms "above", "below", "top", "bottom", and the like are relative to the given axis.

The term "providing", such as for "providing a material", when recited in the claims, is not intended to require any particular delivery or receipt of the provided item. Rather, the term "providing" is merely used to recite items that will be referred to in subsequent elements of the claim(s), for purposes of clarity and ease of readability.

Unless otherwise specified, temperatures referred to herein are based on atmospheric pressure (i.e. one atmosphere).

The terms "about" and "substantially" are used herein with respect to measurable values and ranges due to expected variations known to those skilled in the art (e.g., limitations and variabilities in measurements).

DETAILED DESCRIPTION

The present disclosure is directed to 3D printing apparatus build surfaces and substrates on which 3D parts are printed. As discussed below, a platen assembly is configured to receive a removable build tray or sheet, and a lever release mechanism of the platen assembly is configured to both secure the build tray in place on the platen and provide a mechanical advantage to aid in ejecting or removing the build tray after the printed part is completed.

The apparatus of the present disclosure, including platen assemblies, removable build trays, lever release mechanism and other disclosed features, may be used with any suitable extrusion-based additive manufacturing system. The disclosed features can be used with newly manufactured additive manufacturing systems, or existing additive manufacturing systems can be retrofitted to utilize the features of the present disclosure.

Figure 1:
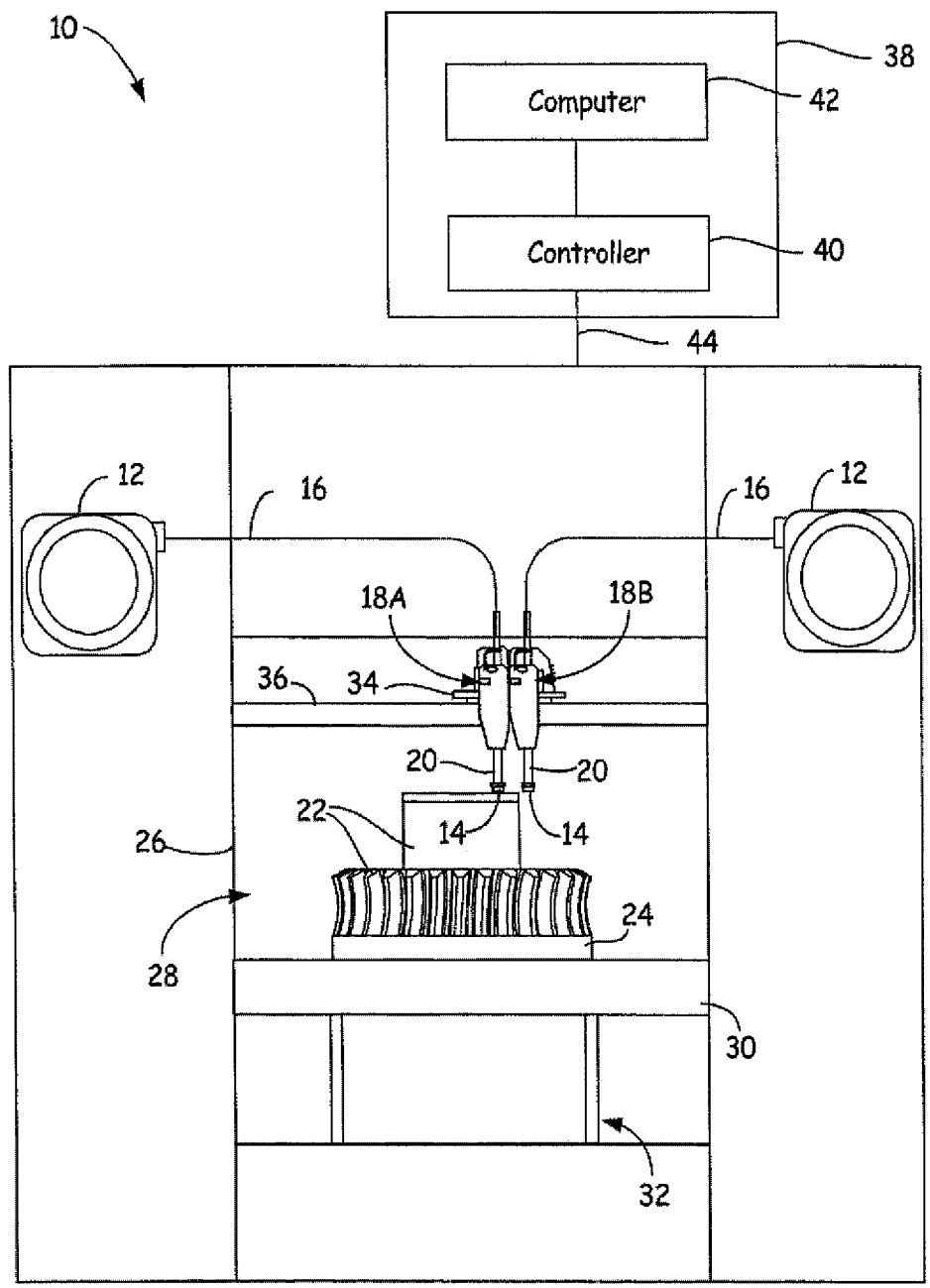
FIG. 1 is a front view of a 3D printer configured to print 3D parts and support structures.

The present disclosure may be used with any suitable additive manufacturing system, commonly referred to as a 3D printer. For example, FIG. 1 illustrates a 3D printer 10 that has a substantially horizontal print plane where the part being printed is indexed in a substantially vertical direction as the part is printed in a layer-by-layer manner using at least one print head. For example, in FIG. 1, 3D printer 10 includes two print heads 18A, 18B and two consumable assemblies 12, where each consumable assembly 12 is an easily loadable, removable, and replaceable container device that retains a supply of a consumable filament for printing with system 10. Typically, one of the consumable assemblies 12 contains a part material filament, and the other consumable assembly 12 contains a support material filament, each supplying filament to one print head 18A or 18B. However, both consumable assemblies 12 may be identical in structure. Each consumable assembly 12 may retain the consumable filament on a wound spool, a spool-less coil, or other supply arrangement, such as discussed in Swanson et al., U.S. Pat. No. 8,403,658; Turley et al. U.S. Pat. No. 7,063,285; Taatjes at al., U.S. Pat. No. 7,938,356; and Mannella et al., U.S. Pat. Nos. 8,985,497 and 9,073,263.

Each print head 18A and 18B is an easily loadable, removable and replaceable device comprising a housing that retains a liquefier assembly 20 having a nozzle tip 14. Each print head 18A and 18B is configured to receive a consumable material, melt the material in liquefier assembly 20 to produce a molten material, and deposit the molten material from a nozzle tip 14 of liquefier assembly 20. Examples of suitable liquefier assemblies for print head 18 include those disclosed in Swanson et al., U.S. Pat. No. 6,004,124; LaBossiere, et al., U.S. Pat. No. 7,604,470; Leavitt, U.S. Pat. No. 7,625,200; and Batchelder et al., U.S. Pat. No. 8,439,665. Other suitable liquefier assemblies include those disclosed in Batchelder et al., U.S. Pat. No. 9,327,447; and in PCT publication No. WO2016014543A.

Guide tube or feed tube 16 interconnects consumable assembly 12 and print head 18A or 18B, where a drive mechanism of print head 18A or 18B (or of 3D printer 10) draws successive segments of the consumable filament from consumable assembly 12, through guide tube or feed tube 16, to liquefier assembly 20 of print head 18A or 18B. In this embodiment, guide or feed tube 16 may be a component of 3D printer 10, rather than a sub-component of consumable assemblies 12. In other embodiments, guide tube 16 is a sub-component of consumable assembly 12, and may be interchanged to and from 3D printer 10 with each consumable assembly 12. During a build operation, the successive segments of consumable filament that are driven into print head 18A or 18B are heated and melt in liquefier assembly 20. The melted material is extruded through nozzle tip 14 in a layer wise pattern to produce printed parts.

Exemplary 3D printer 10 is an additive manufacturing system for printing 3D parts or models and corresponding support structures (e.g., 3D part 22 and support structure 24) from the part and support material filaments, respectively, of consumable assemblies 12, using a layer-based, additive manufacturing technique. Suitable additive manufacturing systems for 3D printer 10 include fused deposition modeling systems developed by Stratasys, Inc., Eden Prairie, Minn. under the trademark "FDM."

As shown, 3D printer 10 includes system casing 26, chamber 28, platen 30, platen gantry 32, head carriage 34, and head gantry 36. System casing 26 is a structural component of system 10 and may include multiple structural sub-components such as support frames, housing walls, and the like. In some embodiments, system casing 26 may include container bays configured to receive consumable assemblies 12. In alternative embodiments, the container bays may be omitted to reduce the overall footprint of 3D printer 10. In these embodiments, consumable assembly 12 may stand proximate to system casing 26, while providing sufficient ranges of movement for guide or feed tubes 16 and print heads 18 that are shown schematically in FIG. 1.

Chamber 28 is an enclosed environment that contains platen 30 for printing 3D part 22 and support structure 24. Chamber 28 may be heated (e.g., with circulating heated air) to reduce the rate at which the part and support materials solidify after being extruded and deposited (e.g., to reduce distortions and curling). In alternative embodiments, chamber 28 may be omitted and/or replaced with different types of build environments. For example, 3D part 22 and support structure 24 may be built in a build environment that is open to ambient conditions or may be enclosed with alternative structures (e.g., flexible curtains).

Platen 30 is a platform on which 3D part 22 and support structure 24 are printed in a layerwise manner, and is supported by platen gantry 32. In some embodiments, platen 30 may engage and support a build tray, which may be a tray substrate as disclosed in Dunn et al., U.S. Pat. No. 7,127,309. As discussed below in greater detail, platen 30 can be a component of a platen assembly configured to support a removable build tray and which includes support and coupling components which releasably secure the build tray to the platen during printing or build of the part, while facilitating removal of the build tray and part once completed. Platen gantry 32 is a gantry assembly configured to move platen 30 along (or substantially along) the vertical z-axis.

Head carriage 34 is a unit configured to receive and retain one or both print heads 18A and 18B, and is supported by head gantry 36. Head carriage 34 preferably retains each print head 18A and 18B in a manner that prevents or restricts movement of the print head 18 relative to head carriage 34 so that nozzle tip 14 remains in the x-y build plane, but allows nozzle tip 14 of the print head 18 to be controllably moved out of the x-y build plane through movement of at least a portion of the head carriage 34 relative the x-y build plane (e.g., servoed, toggled, or otherwise switched in a pivoting manner).

In the shown embodiment, head gantry 36 is a robotic mechanism configured to move head carriage 34 (and the retained print heads 18A and 18B) in (or substantially in) a horizontal x-y plane above platen 30. Examples of suitable gantry assemblies for head gantry 36 include those disclosed in Swanson et al., U.S. Pat. No. 6,722,872; and Comb et al., U.S. Pat. No. 9,108,360, where head gantry 36 may also support deformable baffles (not shown) that define a ceiling for chamber 28. Head gantry 36 may utilize any suitable bridge-type gantry or robotic mechanism for moving head carriage 34 (and the retained print heads 18), such as with one or more motors (e.g., stepper motors and encoded DC motors), gears, pulleys, belts, screws, robotic arms, and the like.

In an alternative embodiment, platen 30 may be configured to move in the horizontal x-y plane within chamber 28, and head carriage 34 (and print heads 18A and 18B) may be configured to move along the z-axis. Other similar arrangements may also be used such that one or both of platen 30 and print heads 18A and 18B are moveable relative to each other. Platen 30 and head carriage 34 (and print heads 18A and 18B) may also be oriented along different axes. For example, platen 30 may be oriented vertically and print heads 18A and 18B may print 3D part 22 and support structure 24 along the x-axis or the y-axis.

3D printer 10 also includes controller assembly 38, which may include one or more control circuits (e.g., controller 40) and/or one or more host computers (e.g., computer 42) configured to monitor and operate the components of 3D printer 10. For example, one or more of the control functions performed by controller assembly 38, such as performing move compiler functions, can be implemented in hardware, software, firmware, and the like, or a combination thereof; and may include computer-based hardware, such as data storage devices, processors, memory modules, and the like, which may be external and/or internal to 3D printer 10.

Controller assembly 38 may communicate over communication line 44 with print heads 18A and 18B, chamber 28 (e.g., with a heating unit for chamber 28), head carriage 34, motors for platen gantry 32 and head gantry 36, and various sensors, calibration devices, display devices, and/or user input devices. In some embodiments, controller assembly 38 may also communicate with one or more of platen 30, platen gantry 32, head gantry 36, and any other suitable component of 3D printer 10. While illustrated as a single signal line, communication line 44 may include one or more electrical, optical, and/or wireless signal lines, which may be external and/or internal to 3D printer 10, allowing controller assembly 38 to communicate with various components of 3D printer 10.

During operation, controller assembly 38 may direct platen gantry 32 to move platen 30 to a predetermined height within chamber 28. Controller assembly 38 may then direct head gantry 36 to move head carriage 34 (and the retained print heads 18A and 18B) around in the horizontal x-y plane above chamber 28. Controller assembly 38 may also direct print heads 18A and 18B to selectively draw successive segments of the consumable filaments from consumable assemblies 12 and through guide or feed tubes 16, respectively.

While FIG. 1 illustrates a 3D printer 10 where a build plane is in a substantially horizontal x-y plane and the platen 30 is moved in a z direction substantially normal to the substantially horizontal x-y build plane, the present disclosure is not limited to a 3D printer 10 as illustrated in FIG. 1.

Figure 2:
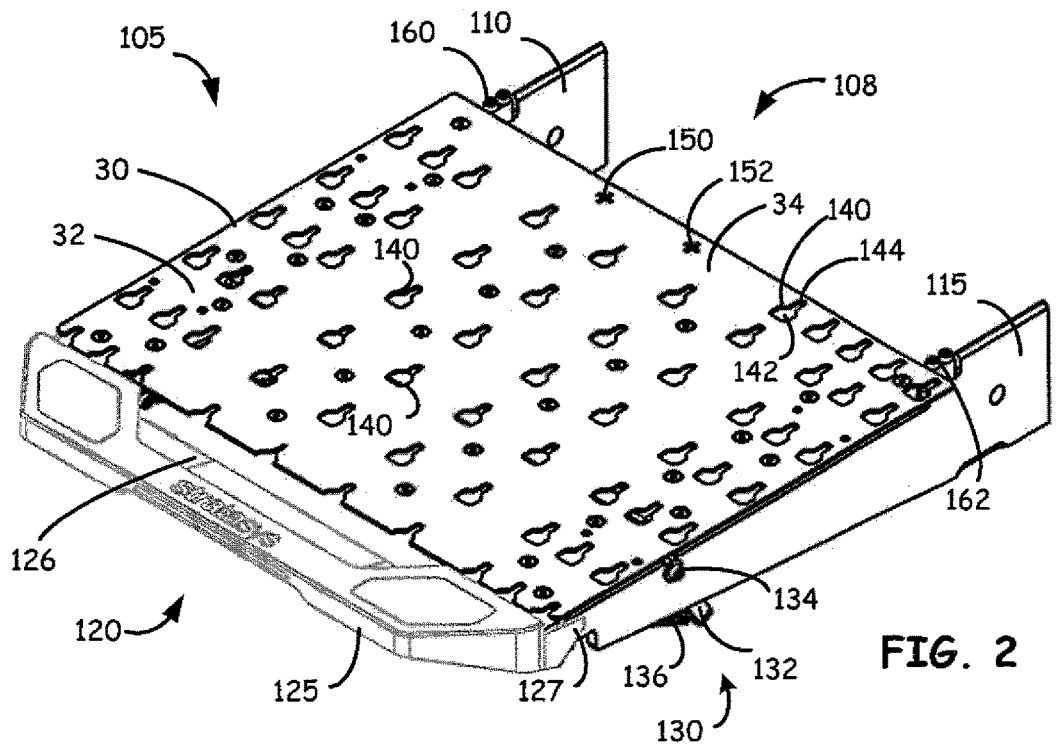
FIG. 2 is a perspective view of a platen assembly in accordance with exemplary embodiments of the present disclosure.

Referring now to FIG. 2, shown in a perspective view is a platen assembly 105 in accordance with some exemplary embodiments. Platen assembly 105 includes the platen 30 configured to receive and removably support a tray type of build substrate, build tray 200 (shown in FIG. 3), on which a part is to be build. Platen 30 is mounted on a frame 108 including first and second frame support members 110 and 115. While in the illustration of FIG. 2 only first and second generally vertically oriented frame support members 110 and 115 are shown, it must be understood that frame 108 can include other portions or members, including for example horizontally extending members. Also, while platen 30 can be mounted or otherwise secured to frame 108, in other embodiments platen 30 can be integrally formed with frame 108.

Positioned respectively on frame support members 110 and 115 are positioning stops 160 and 162, in some exemplary embodiments, used to aid in aligning platen 30 during manufacture of platen assembly 105 if desired. Platen 30 includes, in exemplary embodiments, calibration targets 150 and 152 which, in conjunction with print head 18, sensors and/or other calibration devices, aids controller assembly 38 in conducting calibration processes prior to printing a part, such as is disclosed in U.S. Pat. No. 9,205,690. Using stops 160 and 162 to align platen 30 for proper positioning of calibration targets 160 and 162 can be useful in this process.

Platen 30 and build tray 200 are configured to be releasably locked together in a connected position, wherein the build tray is supported in a defined position on the platen. In the exemplary embodiment illustrated in FIG. 2, the platen 30 includes female connectors 140 on a top surface 32 of the platen. The female connectors 140 are configured to engage corresponding male connectors on a bottom side of build tray 200. These male connectors 305 which can be formed integrally with the bottom side 302 of the build substrate or can be attached thereto, are shown for example, in FIGS. 5A-5C. Thus, build tray 200 is a "slot and foot" style of build substrate.

Referring again more specifically to FIG. 2, female connectors 140 are shown spaced apart on top surface 32 of platen 30, with connectors 140 being in some exemplary embodiments keyhole openings in the top surface and configured to receive the male connectors 305 in the form of projections from bottom side 302 of build tray 200. The particular shape, number and placement of keyhole openings in top surface 32 can be complimentary to the shape, number and placement of male connectors or projections on bottom side 302 of the build tray, and can vary based upon the particular needs of different modeling systems and apparatus. In the example embodiment shown in FIG. 2, the keyhole openings forming female connectors 140 have main openings 142 which are forward of slots 144 to allow insertion of the male connector projections into the main openings and then capture of the male connector projections when the projections are moved into the forward slots. The male/female connectors on build tray 200 and platen 30 can be of any desired configuration or type. For example, the connectors can be similar to the connectors described in Dunn et al., U.S. Pat. No. 7,127,309.

Figure 3:
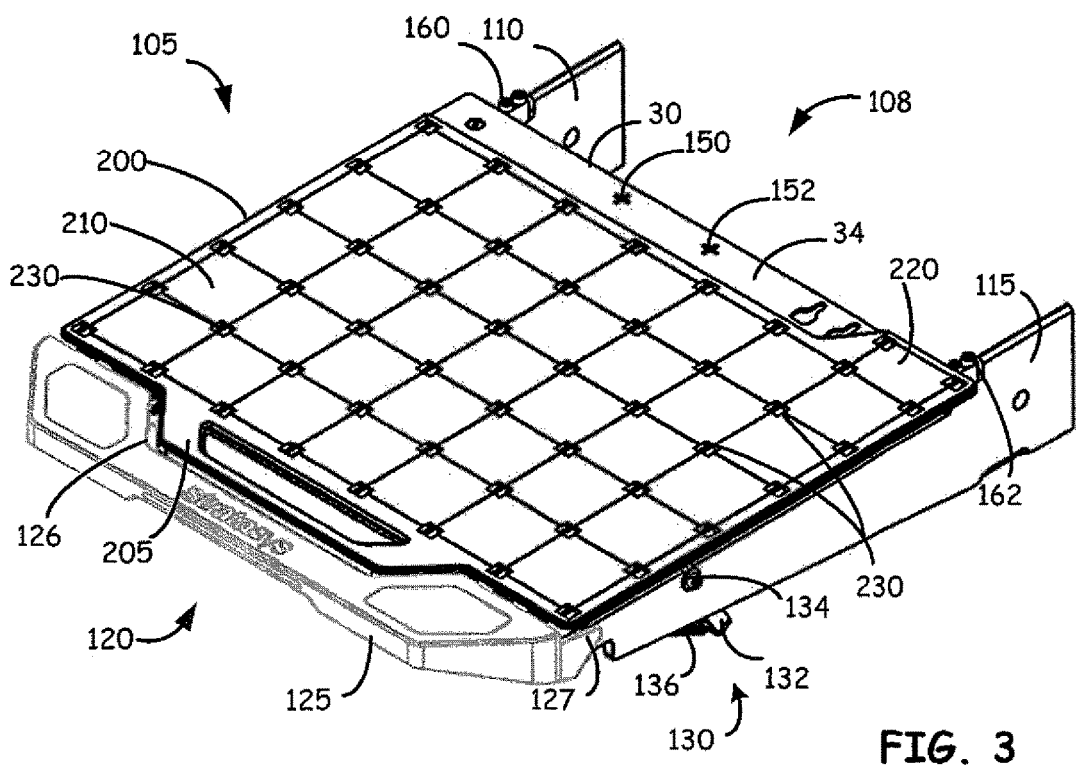
FIGS. 3 and 4 are perspective views of the platen assembly shown in FIG. 2 with a build sheet or substrate releasably secured to the platen.

As can be seen in FIG. 3, in exemplary embodiments, build tray 200 can comprise a handle 205 and a substrate 210 providing a substantially flat modeling surface having a texture selected for desired adherence and release characteristics according to the particular modeling process parameters and modeling material used to build parts on the build tray 200. For example, the texture may range from smooth (rms roughness less than about 0.001 in.) to rough (rms roughness greater than about 0.001 in.), though disclosed embodiments are not limited to any particular texture. The substrate 210 of the build tray 200 is substantially rigid so as to adequately support a part under construction, yet it can be flexed slightly so as to assist in releasing a completed part from the build tray 200.

In order to aid in securing and removal of build tray 200 from platen 30, platen assembly 105 also includes a lever release mechanism 120 in some exemplary embodiments. Lever release mechanism 120 includes a lever arm 125 having pivotable attachments 127 to frame members 110 and 115 to allow the lever arm 125 to pivot with respect to frame 108 and other portions of platen assembly 105.

Lever arm 125 includes a recessed portion 126 shaped and configured to received handle 205 of build tray 200. FIG. 3 illustrates lever arm 125 in a position in which handle 205 of build tray 200 is positioned within and interfaced with recess 126. As will be discussed further below, this allows both securing of build tray 200 to platen 30 of assembly 105, and mechanically aided release of the build tray from the platen. Lever release mechanism 120 also includes a bias mechanism 130 coupling lever arm 125 to the remainder of frame 108 and configured to provide the bias forces to aid in securing build tray 200 to platen 30, as well as to aid in releasing build tray 200 from platen 30 after a part has been fully constructed. In an exemplary embodiment, in order to provide bias forces for achieving both purposes, bias mechanism 130 is an over-center spring mechanism having a spring arm 132 pivotally attached to frame members 110 and 115 at pivotal attachments 134, and a spring 136 attached to spring arm 132 and to lever arm 125.

However, removing a "slot and foot" style of substrate after a part is built can be difficult. Using over-center bias mechanism 130 and lever arm 125, a mechanical advantage is provided to aid in the ejection of the build tray 200. The design also ensures that the build tray is locked onto platen 30 during the build, and prevents a user from starting the build process on a loose build substrate.

Figure 4:
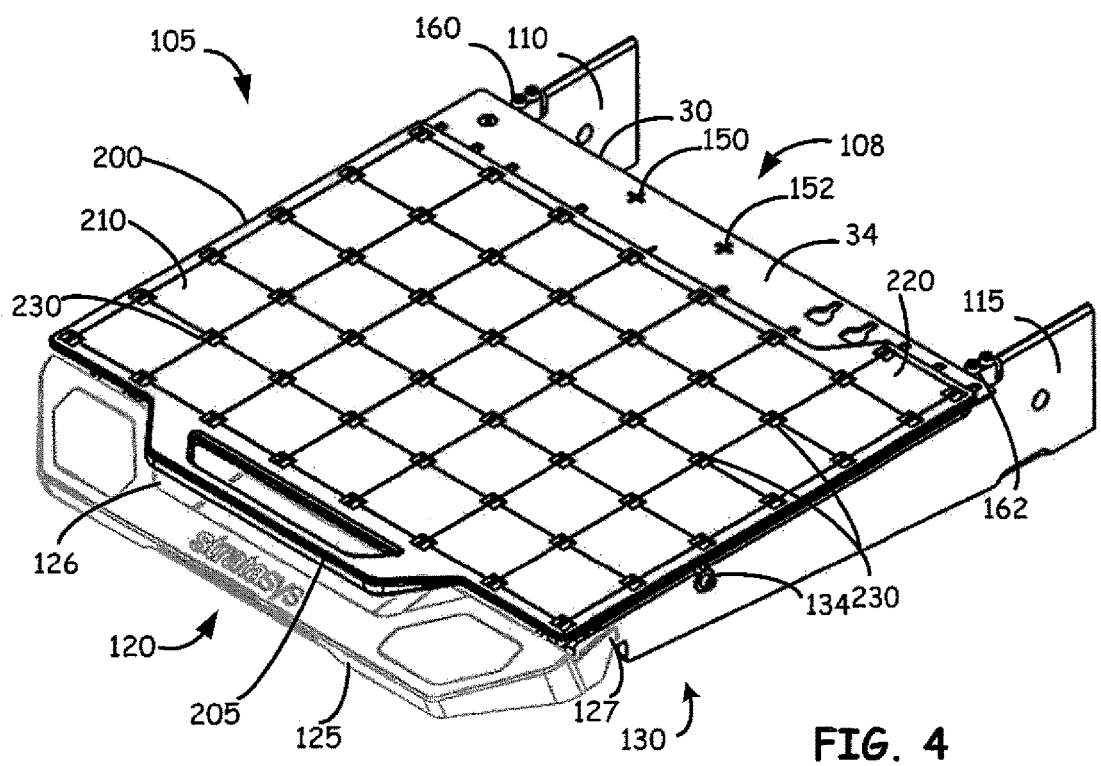

In order to build a part using system 10, a build tray 200 is first placed on top of platen 30 with male connectors or projections 305 (shown in FIG. 5A-5C) aligned with openings 142 of corresponding keyholes 140. In some embodiments, it can be beneficial to preheat build tray 200 prior to aligning male connectors or projections 305 and keyholes 140. Once placed on top of platen 30, build tray 200 can be moved rearward on the platen such that projections 305 engage slots 144 to restrain vertical movement of the build substrate relative to the platen. Lateral movement is also restrained. Lever arm 125 of lever release mechanism 120 will be in a released position such as shown in FIG. 4.

After insertion of the projections 305 of build tray 200 into keyholes 140, handle 125 can be lifted by an operator of the system. Lifting of handle 125 causes surfaces of recess 126 and other portions of handle 125 engage build tray 200 and apply a force on build tray 200 toward stops 160 and 162. Once the center position of bias mechanism 130 has been surpassed by lifting handle 125, bias mechanism 130 applies a force to maintain the locked or secured position of handle 125 to maintain projections 305 within slots 144 of the corresponding keyholes regardless of thermal expansion, vibrations, etc. This provides a secure mechanism for locking build tray 200 in place and preventing movement of the substrate during creation of a part. The locked position of build tray 200 on assembly 105 is illustrated in FIG. 3.

Once build tray 200 is locked in position, system 10 can perform a detection process or method to ensure that build tray 200 is properly mounted on platen 30 and secured thereto. System 10 is programmed with a substrate detection routine which identifies proper placement of build substrate 200 by detecting proper placement of extension tab 220 of the build substrate, and responsibly configuring operating parameters of the machine, such as the base layer material, extrusion speed, extrusion temperature and extrusion tip height. Extension tab 220 also provides a location for system 10 to print a purge tower during purge operations for each print head or deposition line, such as a purge tower built according to Swanson et. al. U.S. Publication No. 2014025684.

One exemplary substrate detection routine may be performed using a sensing apparatus disclosed in U.S. Pat. No. 6,629,011, assigned to Stratasys, Inc. and hereby incorporated by reference as if set forth fully herein. The sensing apparatus includes a plunger and a sensor coupled to the extrusion head of a three-dimensional modeling machine, which are known in the art for use in finding a z-start position of a modeling platform by detecting the top surface of a substrate mounted on the platform. To detect the top surface of the substrate, the plunger is positioned over the substrate, the platform is driven upward, and the sensor emits a signal when it detects that the substrate mounted on the platform has pushed the plunger to a sensing location. By monitoring the z-axis coordinate of the platform at the time the signal is emitted, the height of the tray can be calculated.

The sensing apparatus as disclosed in the '011 patent can be used to determine whether or not the extension tab 220 of build tray 200 is present at a predetermined location on the platen 30. Specifically, the substrate detection routine can be implemented by positioning the plunger in a first location 34 over the platen, recording the z-axis coordinate of the when a detection signal is emitted, then moving the plunger to a second location where the extension tab 220 is expected. The platform is driven upward to just beyond the previously recorded z-axis coordinate. If the extension tab 220 of build tray 200 is present on the platen 30, the build tray 200 will contact the plunger and be detected by the sensor. If the extension tab 220 is not present, the plunger will not be contacted and the sensor will not emit a detection signal. When the extension tab 220 is detected, the system 10 can configure its settings for modeling accordingly and allow modeling to begin. When the tab 220 is not detected, the system 10 prevents modeling from initiating.

As shown in FIGS. 3 and 4, pairs of rectangular holes 230 extend through the build tray 200 in some embodiments. The holes 230 can be included to simplify the manufacture of the tray 200 by injection molding. In building a part on the tray 200, the system 10 can be programmed to either avoid or minimize the amount of material deposited on the holes 230. Those skilled in the art will recognize that a build tray according to the present disclosure could be manufactured without inclusion of the holes 230, by injection molding or by other techniques, thereby eliminating any concern in regards to the placement of material on the substrate.

As discussed above, lever release mechanism 120 can be used to lock or secure build tray 200 in place on platen 30 to ensure that the build substrate does not move during creation of a part. Again, the locked position is illustrated in FIG. 3. After the part is built on tray 200 and exerts forces on the substrate, removal of the build tray can be more difficult. As discussed above, in disclosed embodiments the mechanical advantage provided by lever release mechanism 120 is used to aid in removal of build tray 200 when an operator applies downward force on lever arm 125. The released position of lever arm 125 of release mechanism 120 is shown in FIG. 4.

Using the lever arm 125 and the over-center spring arrangement of bias mechanism 130, a mechanical advantage can be used to increase forces applied by an operator to lever arm 125, with the increased forces applied to lift build tray 200 off of platen 30. In some embodiments, using a lever arm and the over-center spring arrangement, a mechanical advantage of multiple times the operator applied force can be achieved for this purpose. For example, in some embodiments a mechanical advantage of approximately 2.5 to 1 can be achieved. However, those of skill in the art will recognize that no particular mechanical advantage ratio is required to benefit from disclosed concepts.

Figure 5A:
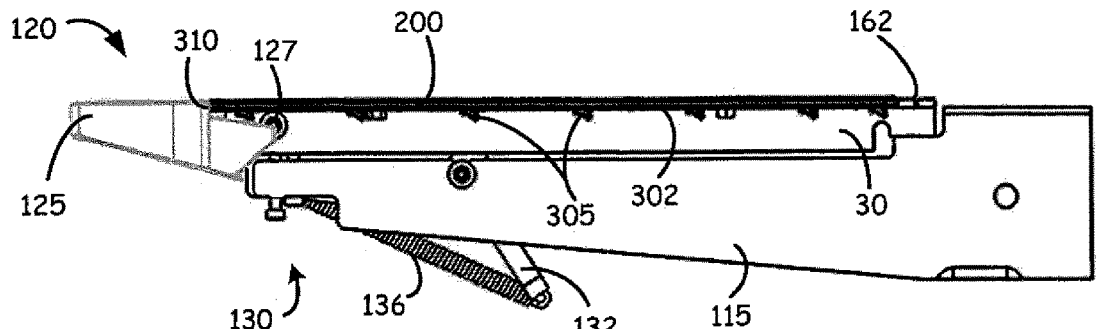
FIGS. 5A-5D are side view illustrations of the platen assembly shown in FIGS. 2-4 and illustrating the process of removal of the build sheet or substrate from the platen.

Referring now to FIGS. 5A through 5D, shown are side view illustrations demonstrating removal of build tray 200 from platen 30 using the lever release mechanism 120. First, as shown in FIG. 5A, build tray 200 is shown locked or secured in position on platen 30 with edge surfaces 310 of lever arm 125 engaging tray 200. In this position, bias mechanism 130 applies force to maintain lever arm 125 in its locked orientation, and thereby maintains contact between male connectors or projections 305 of tray 200 and corresponding female connectors or keyholes 140 of platen 30.

Figure 5B:
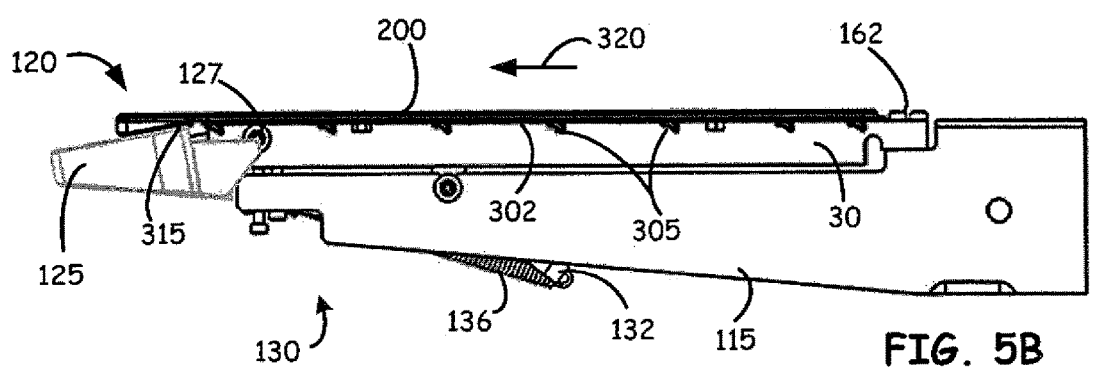
Figure 5C:
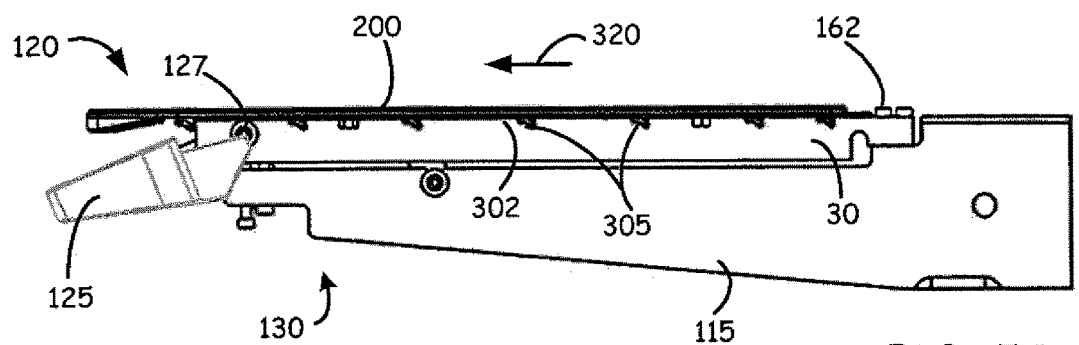
Figure 5D:
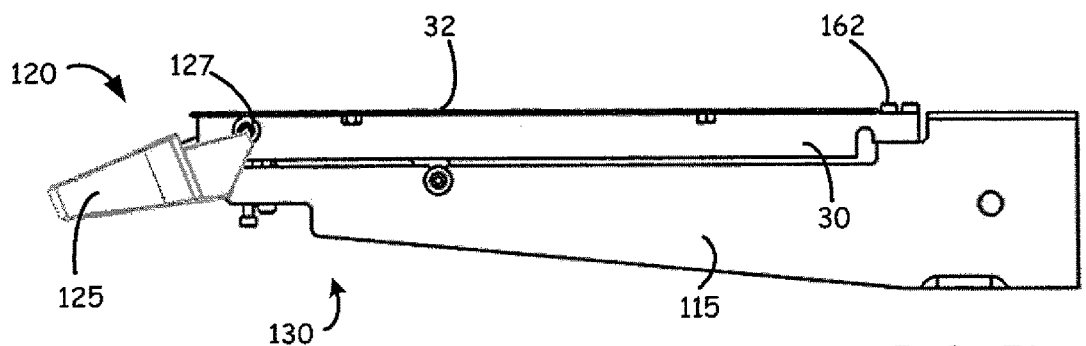

Next, as shown in FIG. 5B, when lever arm 125 is rotated downward by an operator, compression contact between edge surfaces 310 and build tray 200 is eliminated, allowing build tray 200 to move in the direction indicated by arrow 320. Also, a corner 315 or other portion of lever arm 125 makes contact with the bottom side 302 of build tray 200 and lifts the substrate upward off of platen 30. FIG. 5C illustrates further progression of build substrate 200 in direction 320, and FIG. 5D illustrates platen assembly 105 with the build substrate fully removed. With the part and build substrate removed, the operator can remove the part from the build substrate and if the substrate is not damaged by the removal process or the modeling process, it may be reinserted into the system 10 and reused in subsequent build jobs.

Although the present disclosure has been described with reference to preferred embodiments, workers skilled in the art will recognize that changes may be made in form and detail without departing from the spirit and scope of the disclosure.

The invention claimed is:

1. A platen assembly for use in a 3D printer when printing a part, the platen assembly comprising:
   a frame a front end and a back end;
   a platen having a front edge and a back edge, the platen supported by the frame and configured to receive a removable build tray; and
   a lever release mechanism coupled to the frame, the lever release mechanism comprising:
      a lever arm pivotally attached to the frame a distance from the front end and a distance from the platen, wherein the lever arm is configured to be pivoted upwardly to a secured position to engage and secure the build tray to the platen for printing of the part and pivoted downwardly to a released position where the lever arm engages the build tray where mechanical advantage of the lever arm is utilized to eject the build tray from the platen after printing of the part; and
      a bias mechanism comprising an over center spring mechanism having a spring arm pivotally coupled to the frame, and a spring coupled to each of the spring arm and the lever arm, the biasing mechanism configured to bias the lever arm toward each of the secured position and the released position, wherein the biasing mechanism provides for improved locking of the build tray to the platen and ease of removal of the build tray from the platen after the part is printed.

2. The platen assembly of claim 1, wherein the bias mechanism comprises an over-center spring mechanism.

3. The platen assembly of claim 1, wherein the mechanical advantage is greater than 2 to 1.

4. The platen assembly of claim 1, wherein the lever arm is configured to provide a recessed area to receive a handle of a received build tray when the lever arm is moved to the secured position.

5. The platen assembly of claim 1, wherein the platen further comprises at least one calibration target formed thereon.

6. The platen assembly of claim 5, wherein the platen is configured such that, with the build tray secured thereto, the build tray does not cover the at least one calibration target.

7. The platen assembly of claim 1, wherein the platen includes a plurality of keyholes each configured to receive one of a plurality of projections on the build tray to inhibit vertical movement of the build tray when the lever arm is moved to the secured position.

8. A combination for use in a 3D printer when printing a part, the combination comprising:
   a removable build tray; and
   a platen assembly comprising a frame having a front edge and a back edge, a platen supported by the frame and configured to receive the removable build tray, and a lever release mechanism coupled to the frame a distance from the front edge;
   wherein the lever release mechanism comprises:

a lever arm rotatably coupled to the frame a distance from the front edge and a distance from the platen, the lever arm configured to be rotated upwardly to a secured position to engage and secure the build tray to the platen for printing of the part and rotated downwardly to a released position to wherein a length of the lever release mechanism provides a mechanical advantage in ejecting the build tray from the platen after printing of the part; and a bias mechanism comprising an over-center spring mechanism having a spring arm pivotally coupled to the frame, and a spring coupled to each of the spring arm and the lever arm, the bias mechanism configured to bias the lever arm toward each of the secured position and the released position, wherein the biasing mechanism provides for improved locking of the build tray to the platen and ease of removal of the build tray from the platen after the part is printed.

9. The combination of claim 8, wherein the build tray further comprises a handle, and wherein the lever arm is configured to provide a recessed area to receive the handle of the build tray when the lever arm is moved to the secured position.

10. The combination of claim 8, wherein the platen further comprises at least one calibration target formed thereon.

11. The combination of claim 10, wherein the build tray includes an extension tab which extends a length of a portion of the build tray, and wherein when the build tray is secured to the platen the portion of the build tray and the extension tab together extend substantially an entire length of the platen to provide a purge tower build location without the build tray or extension tab covering the at least one calibration target.

12. The combination of claim 8, wherein the build tray further includes a plurality of projections and the platen further includes a plurality of keyholes each configured to receive one of the plurality of projections to inhibit vertical and lateral movement of the build tray relative to the platen when the lever arm is moved to the secured position.

* * * * *